US011668944B2

(12) United States Patent
Parkinson et al.

(10) Patent No.: US 11,668,944 B2
(45) Date of Patent: Jun. 6, 2023

(54) MODULAR HEAD-MOUNTED PERIPHERAL PLATFORM

(71) Applicant: RealWear, Inc., Vancouver, WA (US)

(72) Inventors: Christopher Iain Parkinson, Richland, WA (US); Sanjay Subir Jhawar, Menlo Park, CA (US); Stephen A. Pombo, Campbell, CA (US); George Henry Hines, San Francisco, CA (US); Nima Lahijani Shams, San Jose, CA (US)

(73) Assignee: RealWear, Inc., Vancouver, WA (US)

( * ) Notice: Subject to any disclaimer, the term of this patent is extended or adjusted under 35 U.S.C. 154(b) by 22 days.

(21) Appl. No.: 16/908,501

(22) Filed: Jun. 22, 2020

(65) Prior Publication Data

US 2020/0400961 A1    Dec. 24, 2020

Related U.S. Application Data

(60) Provisional application No. 62/864,790, filed on Jun. 21, 2019.

(51) Int. Cl.
*G09G 5/00* (2006.01)
*G02B 27/01* (2006.01)
*H04W 4/80* (2018.01)

(52) U.S. Cl.
CPC ..... *G02B 27/0176* (2013.01); *G02B 27/0101* (2013.01); *G02B 27/0172* (2013.01); *H04W 4/80* (2018.02); *G02B 2027/0138* (2013.01)

(58) Field of Classification Search
CPC ............ G02B 27/0176; G02B 27/0101; G02B 27/0172; H04W 4/80

(Continued)

(56) References Cited

U.S. PATENT DOCUMENTS 5,880,773 A    3/1999 Suzuki
6,424,321 B1   7/2002 Ronzani et al.
(Continued)

OTHER PUBLICATIONS

International Preliminary Report on Patentability received for PCT Application No. PCT/US2020/039004, dated Dec. 30, 2021, 7 pages.

(Continued)

*Primary Examiner* — Jonathan M Blancha
(74) *Attorney, Agent, or Firm* — Shook, Hardy & Bacon LLP

(57) ABSTRACT

The invention is directed towards a wearable platform system (e.g., head-mounted computing device) that allows for various modular peripheral devices to be interchangeably attached and detached, as well as methods and systems for transitioning an operational mode of the wearable platform between a hard connection mode and a wireless connection mode when a peripheral device is attached to or removed from the wearable platform. Specifically, the wearable platform may include a base member coupled to one or more arm members. A variety of modular peripheral devices may be attached at a hardware interface of the wearable platform to provide varied functionality to the wearable platform. As a user begins to remove a peripheral device, the wearable platform system may determine the peripheral device is being removed from the wearable platform and may transition from a hard connection mode to a wireless connection mode.

19 Claims, 11 Drawing Sheets

(58) Field of Classification Search
USPC .......................................................... 345/8
See application file for complete search history.

(56) References Cited

U.S. PATENT DOCUMENTS

| | | | |
|---|---|---|---|
| 8,605,008 B1 | 12/2013 | Prest et al. | |
| 8,777,406 B2 | 7/2014 | Sugihara et al. | |
| 9,841,603 B2 | 12/2017 | Halpin et al. | |
| 9,844,144 B1* | 12/2017 | Al-Momani | H05K 1/181 |
| 2006/0109350 A1* | 5/2006 | Yeh | H04N 5/772 |
| | | | 348/207.99 |
| 2006/0119539 A1 | 6/2006 | Kato et al. | |
| 2007/0030442 A1* | 2/2007 | Howell | G02C 11/10 |
| | | | 351/158 |
| 2009/0097688 A1* | 4/2009 | Lewis | H04R 5/0335 |
| | | | 381/376 |
| 2011/0089207 A1* | 4/2011 | Tricoukes | H04M 1/05 |
| | | | 224/181 |
| 2011/0213664 A1 | 9/2011 | Osterhout et al. | |
| 2012/0235896 A1 | 9/2012 | Jacobsen et al. | |
| 2012/0293407 A1 | 11/2012 | Lee | |
| 2013/0002559 A1* | 1/2013 | Vardi | G06F 3/0202 |
| | | | 345/168 |
| 2013/0090062 A1* | 4/2013 | Tricoukes | G02B 27/0176 |
| | | | 361/679.31 |
| 2013/0176626 A1 | 7/2013 | Heinrich et al. | |
| 2013/0182396 A1 | 7/2013 | Hu | |
| 2014/0244854 A1* | 8/2014 | Patel | H04L 65/60 |
| | | | 709/231 |
| 2016/0178903 A1* | 6/2016 | Nakajima | G02B 27/017 |
| | | | 361/807 |
| 2016/0246059 A1 | 8/2016 | Halpin et al. | |
| 2016/0274662 A1 | 9/2016 | Rimon et al. | |
| 2017/0227774 A1 | 8/2017 | Cherdakov et al. | |
| 2017/0264987 A1* | 9/2017 | Hong | H04R 1/1025 |
| 2017/0317490 A1 | 11/2017 | Penny et al. | |
| 2018/0124497 A1* | 5/2018 | Boesen | H04R 1/1091 |
| 2019/0075254 A1 | 3/2019 | Jhawar et al. | |
| 2019/0094981 A1 | 3/2019 | Bradski et al. | |
| 2019/0332566 A1* | 10/2019 | Yasunaka | H04L 25/0272 |
| 2020/0026349 A1* | 1/2020 | Fontanel | G06V 40/19 |
| 2020/0183190 A1* | 6/2020 | Rousseau | G02C 11/10 |

OTHER PUBLICATIONS

International Preliminary Report on Patentability received for PCT Application No. PCT/US2020/038625, dated Dec. 30, 2021, 11 pages.
Preinterview First Office Action dated Dec. 15, 2021 in U.S. Appl. No. 16/905,201, 4 pages.
First Action Interview Office Action dated Mar. 4, 2022 in U.S. Appl. No. 16/905,201, 3 pages.
Preinterview First Office Action dated Mar. 10, 2022 in U.S. Appl. No. 16/905,227, 4 pages.
First Action Interview Office Action dated May 18, 2022 in U.S. Appl. No. 16/905,227, 3 pages.
Notice of Allowance dated Jun. 23, 2022 in U.S. Appl. No. 16/905,127, 9 pages.
Notice of Allowance dated Oct. 5, 2022 in U.S. Appl. No. 16/905,227, 11 pages.
Piccardi, L., et al., "WearCam: A head mounted wireless camera for monitoring gaze attention and for the diagnosis of developmental disorders in young children", 16th IEEE International Conference on Robot & Human Interactive Communication, pp. 594-598 (Aug. 2007).
International Search Report and Written Opinion received for PCT Patent Application No. PCT/US2020/038625, dated Sep. 4, 2020, 13 pages.
International Search Report and Written Opinion received for PCT Patent Application No. PCT/US2020/039004, dated Oct. 9, 2020, 11 pages.

* cited by examiner

MODULAR HEAD-MOUNTED PERIPHERAL PLATFORM

CROSS REFERENCE TO RELATED APPLICATIONS

The present application claims priority from Provisional Application No. 62/864,790 filed Jun. 21, 2019, which is assigned or under obligation of assignment to the same entity as this Application, the entire contents of the application being herein incorporated by reference.

BACKGROUND

Users of head-mounted computing devices—such as head mounted displays (HMDs)—often use head-mounted computing devices in differing ways and/or different users may value different capabilities of different head-mounted computing devices. For example, a firefighter may appreciate a headset that includes an infrared camera to allow the firefighter to detect heat signatures through smoke, find people and localize hotspots of fires. Whereas, a nurse making rounds in a hospital might not need an infrared camera, but may appreciate a RGB camera that provides real-time streaming to an off-site specialist to more accurately and timely care for a patient. While there are various head-mounted computing devices available to users, a user is generally limited to configurations offered by a particular manufacturer and, as such, may purchase a headset that meets some, but not all, of the user's needs.

SUMMARY OF THE INVENTION

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

At a high level, embodiments of the present invention are generally directed to a wearable platform system (e.g., head-mounted computing device) that allows for various modular peripheral devices to be interchangeably attached and detached, as well as methods and systems for transitioning an operational mode of the wearable platform between a hard connection mode and a wireless connection mode when a peripheral device is attached to or removed from the wearable platform. The wearable platform may include a base member that is coupled to one or more arm members. The arm members may include one or more coupling members to allow for modular peripheral devices to be attached to the one or more arm members of the wearable device. The peripheral devices may enable input/output functions of the wearable platform. For example, a camera peripheral that is communicatively connected to a wearable platform may provide image data to the wearable platform. Advantageously, as the peripheral devices are modular, each may be independently created, modified, replaced or exchanged.

In embodiments of the present invention, peripheral devices may be communicatively connected to the wearable platform via a hard connection or a wireless connection. As such, peripheral devices may operate while attached to or detached from the wearable platform. When a peripheral device is attached to the wearable platform, the peripheral device and the wearable platform may operate in a hard connection mode. When a peripheral device is detached from the wearable platform, the peripheral device and the wearable platform may operate in a wireless mode.

Moreover, as a user begins to remove a peripheral device, the wearable platform system may determine the peripheral device is being removed from the wearable platform and may transition from a hard connection mode to a wireless connection mode. For example, while a camera peripheral is attached to an arm of the wearable platform, the camera peripheral may transmit image data to the wearable platform via a hardware interface (i.e., hard connection). A user may then detach the camera peripheral from the hardware interface of the wearable platform and the camera peripheral may continue to transmit image data to the wearable platform via Wi-Fi. By allowing users to detach peripheral devices that that are configured to maintain functionality, users may use those peripheral devices in ways that are not available in conventional systems. For example, a user with a display peripheral and a camera peripheral attached to a wearable platform may remove the camera peripheral and position it around a tight corner where the user's head or the wearable platform may not fit. Thus, allowing the user to see, via the display peripheral, what is around the tight corner.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-11 illustrate an embodiment of the present invention and in which:

FIG. 4 illustrates an example alternate view of a camera module, in accordance with some implementations of the present disclosure;

FIG. 5 illustrates an example locking mechanism 500, in accordance with embodiments of the present disclosure;

FIG. 6 illustrates an example inspection camera module 600, in accordance with embodiments of the present disclosure;

FIG. 8 illustrates method for initiating a wireless connection between a peripheral device and a head-mounted unit, in accordance with embodiments described herein;

FIG. 9 illustrates method for initiating a wireless connection between a peripheral device and a head-mounted unit, in accordance with embodiments described herein;

FIG. 10 provides a block diagram of an exemplary wearable platform in which some implementations of the present disclosure may be employed;

FIG. 11 provides a block diagram of an exemplary computing device in which some implementations of the present disclosure may be employed.

DETAILED DESCRIPTION

Figure 1A:
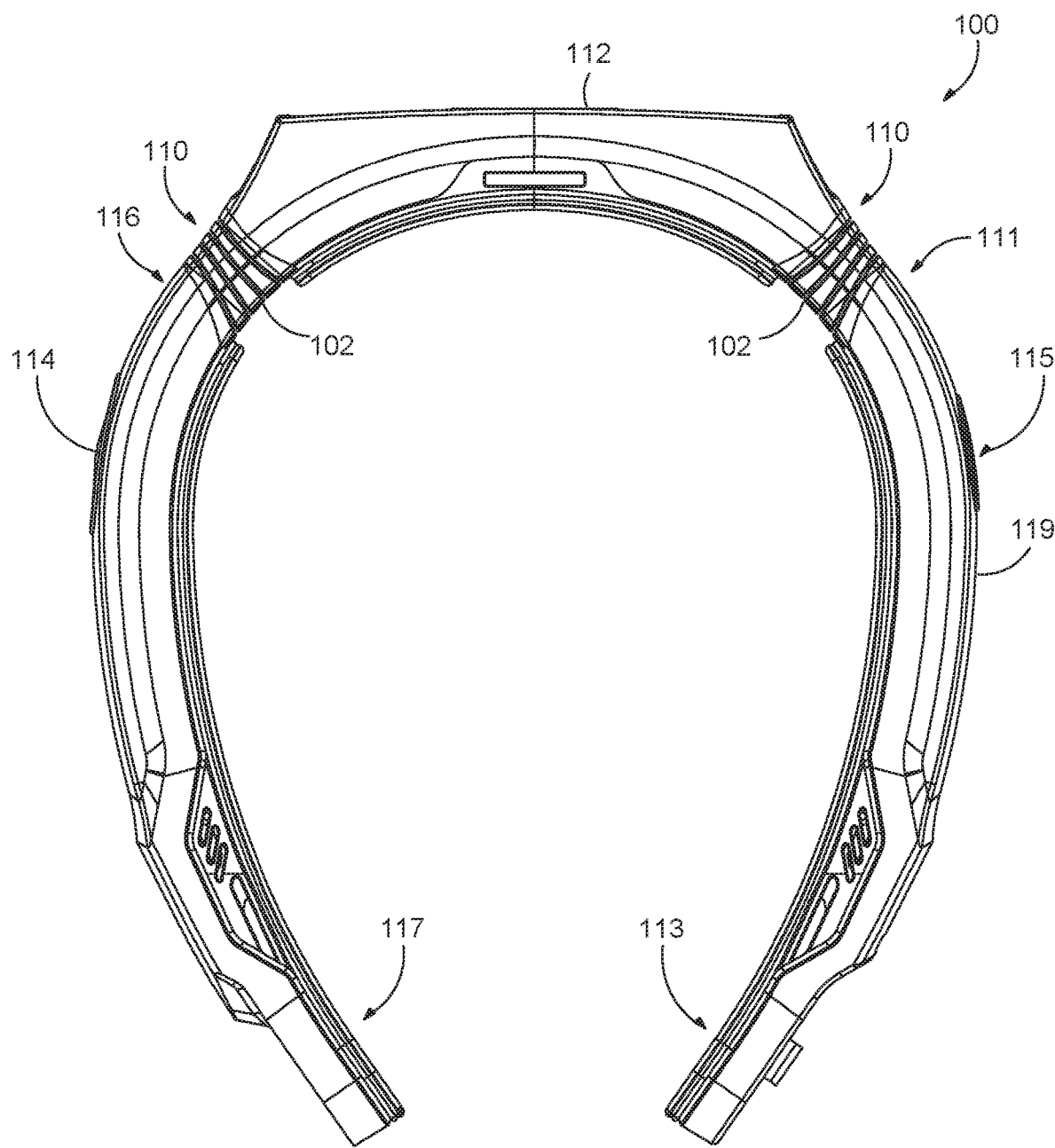
FIG. 1A illustrates a top view of an example wearable platform, in accordance with an embodiment of the present disclosure.

The subject matter of the present technology is described with specificity in this disclosure to meet statutory requirements. However, this description is not intended to limit the scope hereof. Rather, the claimed subject matter may be embodied in other ways, to include different steps, combinations of steps, features, and/or combinations of features, similar to the ones described in this disclosure, in conjunction with other present or future technologies. Moreover, although the terms "step" and "block" may be used to identify different elements of methods employed, the terms should not be interpreted as implying any particular order among or between various steps or blocks unless and except when the order of individual steps or blocks is explicitly described and required.

By way of background, conventional wearable computing devices that support peripheral devices are not modular and, as such, the peripheral devices cannot be independently created, modified, replaced or exchanged. Typically, when a wearable device manufacturer wishes to upgrade a component of their wearable device, the manufacturer is forced to release an entirely new wearable device, which often requires conception of a product (e.g., imagine, specify, plan, innovate), design of the product (e.g., describe, develop, test analyze, validate), and realization of the product (e.g., manufacture, sell, deliver). For example, if a manufacturer has an idea for a new camera for their head mounted display device, the manufacturer must design, manufacture, sell and service an entirely new head mounted display device with the new camera. As a result, manufacturers will often wait until several ideas have been developed before manufacturing a new product, which often extends the time between when an idea for a product/upgrade is conceived and when a customer is able to purchase the new product/upgrade. Further, in conventional wearable devices, if a peripheral device requires service or replacement, oftentimes the entire wearable device must be sent to the manufacturer for service or an entirely new wearable device must be purchased. For example, a user might crack a display on a wearable device and must then send the wearable device to the manufacturer to have the display fixed or replaced. Otherwise, the user must purchase a new wearable device. In such instances, the user may decide the utility of the wearable device does not justify the cost to repair/replace the wearable device and may simply forego repair or replacement, causing the user to be denied the benefits of the wearable device.

Accordingly, embodiments of the present invention are directed towards a wearable platform system (e.g., head-mounted computing device) that allows for various modular peripheral devices to be interchangeably attached and detached, as well as methods and systems for transitioning an operational mode of the wearable platform between a hard connection mode and a wireless connection mode when a peripheral device is attached to or removed from the wearable platform. The wearable platform system includes hardware and an operating system for executing computer-useable instructions and provides the environment (See, FIG. 10) in which software is executed. Specifically, the wearable platform may include a base member coupled to one or more arm members. The one or more arm members may provide one or more hardware interfaces, such as a mating receptacle for a spring-loaded pin connection. A variety of modular peripheral devices (e.g., camera, display, telestrator) may be attached at a hardware interface of the wearable platform to provide varied functionality to the wearable platform.

Peripheral devices may include display devices, camera devices, telestration devices, as well as other sensors or transducers to provide additional functionality to the wearable platform. As different users may have different needs, users may configure the wearable platform to meet a specific need. For example, a firefighter may configure the wearable platform to include an infrared camera to allow the firefighter to detect heat signatures through smoke, find people and localize hotspots of fires. By way of further example, a user working in a harsh environment may opt to attach a display device that is dust and waterproof, whereas a user working in an office environment may attach a display device that is not dust or waterproof. Advantageously, users may select the appropriate peripheral device to meet their needs and may additionally upgrade peripheral devices as desired.

Peripheral devices may be attached to the wearable platform by mechanically coupling a peripheral device to a hardware interface of the wearable platform via one or more fasteners (e.g., clamp, clip, latch, button, magnet, hook and loop, or the like). Attaching a peripheral device to the wearable platform secures the peripheral device to the wearable platform, preventing the peripheral device from becoming dislodged as a user moves their head.

Peripheral devices may also be electrically coupled to the wearable platform. For example, the peripheral device and the wearable platform may have corresponding electrical interfaces (e.g., a set of pogo pins and a set of corresponding pogo targets or mating receptacles) that electrically and communicatively couple the peripheral device to the wearable platform. By utilizing corresponding electrical interfaces, there is no need for exposed wiring that may be accidentally pulled or snagged, thereby disconnecting the peripheral device from the wearable platform.

Further, one or more guiding components may be used to facilitate attaching and detaching peripheral devices. For example, the one or more guiding components may allow the user to attach a camera peripheral to the wearable platform system while wearing the device and unable to see the hardware interface. Additionally, the one or more guiding components may prevent the electrical interface, such as one or more pogo pins, from becoming damaged if a peripheral device is struck or accidentally dropped. The one or more guiding components in combination with the fasteners may thus further secure peripheral devices to the wearable platform system and ensure that the connection is not accidentally disrupted.

To provide increased functional flexibility, a user may remove an operating peripheral device from the wearable platform and continue using the peripheral device wirelessly. For example, a user with a display peripheral and a camera peripheral attached to a wearable platform may remove the camera peripheral and position it around a tight corner where the user's head may not fit. Thus, allowing the user to see or inspect what is around the tight corner. Specifically, as a user begins to remove a peripheral device, the wearable platform system may determine the peripheral device is being removed from the wearable platform and may transition from a hard connection mode to a wireless connection mode.

To determine a peripheral device is being removed from the wearable platform, the system may determine that a set of pogo pins, which are compressed when the peripheral device is connected, have decompressed beyond a threshold distance. Based on determining the pogo pins have decompressed beyond a threshold distance, the system may initiate a wireless connection with the peripheral device being removed. In some embodiments, the set of pogo pins may be longer than those found in conventional systems to allow for the peripheral device to maintain a hard connection for a longer period of time while the wireless connection is being initiated and established with the peripheral device. In other embodiments, the system may determine a peripheral device is being removed based on a determining a mechanical coupling fastener has been released. For example, a peripheral device secured to the wearable platform by a latch may determine that the peripheral device is being removed from the wearable platform by determining that the user as moved the latch to an open position, wherein the peripheral device may be removed.

Upon detection that a peripheral device is being removed from the interface of the wearable platform, the wearable platform system may initiate a wireless connection (e.g., via Wi-Fi, Bluetooth, Zigbee, etc.) with the peripheral device to enable the peripheral device to continue to communicate with the wearable platform once detached. Likewise, upon detection that a peripheral device is being re-attached to the wearable platform, the wearable platform system may initiate a hard connection via an electrical interface and terminate the wireless connection.

A wireless connection mode utilizes radio waves to transfer information between the wearable platform and a peripheral device. Any type of wireless technology and/or protocol (e.g., Wi-Fi, Bluetooth, Zigbee, Z-Wave, etc.) may be used to provide a connection between the wearable device and the wearable platform. The connection between the wearable platform and the peripheral device may be a direct connection or may be an indirect connection, such as via a local area network. When a peripheral device is in a wireless operational mode, the peripheral device may maintain the same or similar functionality as when the peripheral device is connected via a hard connection and operating in a hard connection mode. For example, the wearable platform includes a plurality of microphones to enable a user to operate the platform system via voice commands. Regardless of whether the camera is operating in the hard connection mode or the wireless connection mode, the user may use voice commands to prompt the camera to take a picture.

Further, transitioning to the wireless connection mode may prompt a peripheral device to rely on an internal battery to power the peripheral device. As such, in addition to establishing a wireless connection, upon determining that the peripheral device is being removed, the wearable platform system may prompt the peripheral device to begin powering the device using one or more internal batteries.

Turning initially to FIG. 1A, FIG. 1A illustrates a top, plan view of an example wearable platform 100, in accordance with an embodiment of the present technology. The wearable platform 100 includes a base member 112 and one or more arm members 115, such as a first arm member 114 and a second arm member 119. First arm member 114 includes a first end 116 (also referred to as a proximal end) and a second end 117 (also referred to as a distal end). The first end 116 may be located proximate the base member 112. Second arm member 119 includes a first end 111 (also referred to as a proximal end) and a second end 113 (also referred to as a distal end). The first end 111 may be located proximate the base member 112. The one or more arm members 115 may extend away from the base member 112 and to the second ends 117 and 113.

In some aspects, the one or more arm members 115 and the base member 112 are modular components that may be coupled together. For instance, the first end 116 of the first arm member 114 may be coupled (and/or removable coupled) to the base member 112. Additionally or alternatively, the first end 111 of the second arm member 119 may be coupled (and/or removable coupled) to the base member 112. Advantageously, the modularity of the one or more arm members 115 and the base member 112 allows the arm members 115 and base member 112 to be manufactured separately. As such, the arm members 115 and base member 112 may be manufactured in different locations or at different times. Additionally, in the event that any of the modular components of the head-mounted display system 100 are damaged, the damaged component can be swapped out for a new component without replacing the entire head-mounted display system 100. It should be appreciated that each member itself (e.g., one or more arm members 115 and the base member 112) may be a single, integral component (e.g., formed through a molding process) or formed by multiple components that are coupled to each other to form the member.

Figure 1B:
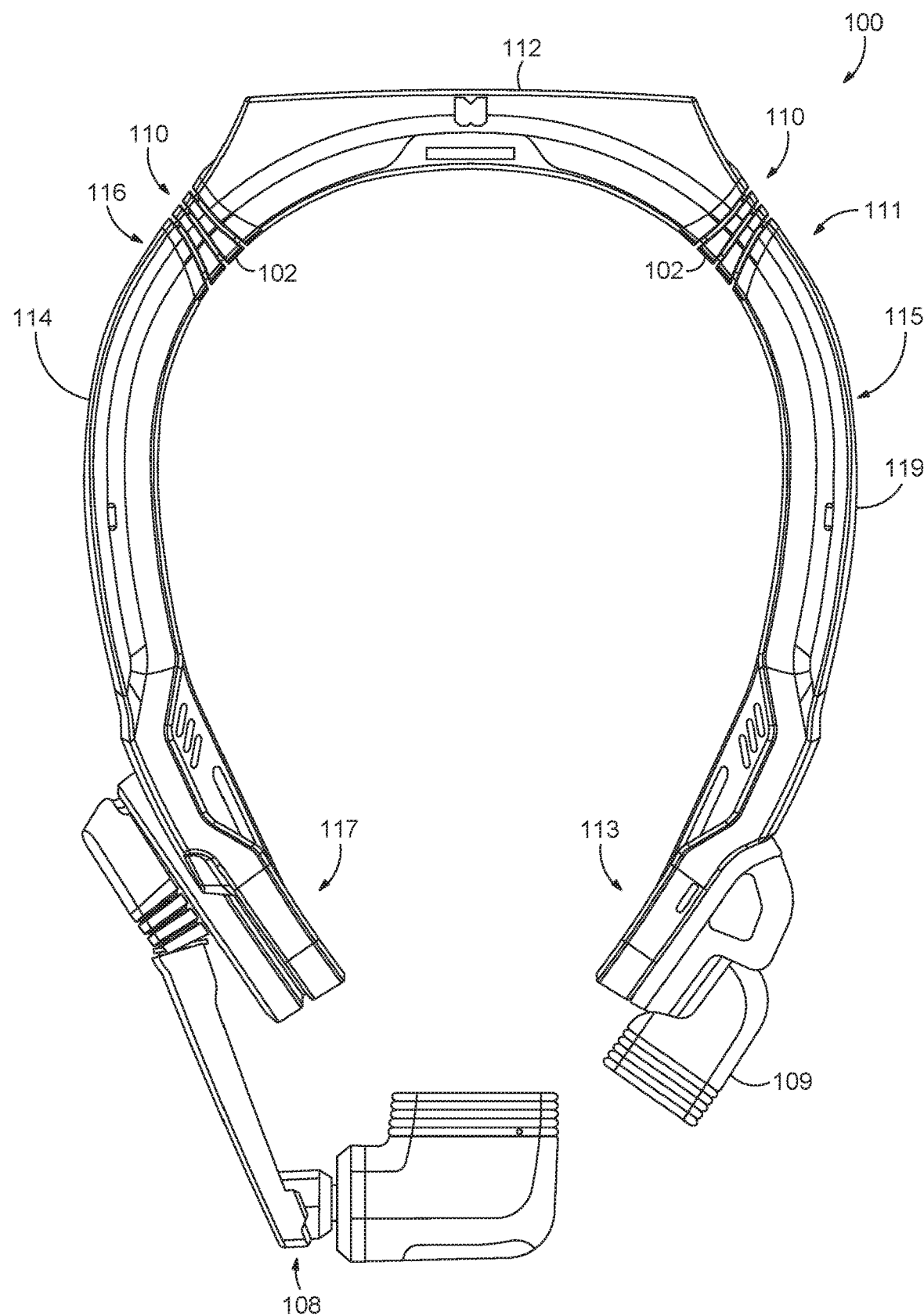
FIG. 1B illustrates an example wearable including a display module, in accordance with some implementations of the present disclosure.

Turning to FIG. 1B, FIG. 1B illustrates an example wearable platform 100 including a display module 108. The display module 108 may be coupled to the second end 117 of the first arm member 114. As used in this disclosure, the term "display module" includes any component that may be used with the wearable platform that is configured to provide a display characteristic that is viewable to a user. A "display characteristic" includes any viewable characteristic, such as a display state (e.g., transparent, partially transparent, non-transparent, selectively transparent, interactive, text/image/video presenting, etc.), a display type (e.g., an optic, waveguide optic, digital display, micro display (e.g., a liquid crystal display (LCD), light-emitting diode (LED) display, organic light-emitting diode (OLED) display, digital light processing (DLP) display, etc.), or any combination thereof, etc.), a display configuration (e.g., one or multiple display portions of the same or different type, display portions at different angles, display portions in different arrangements, etc.), and/or technical specifications of the display portion (e.g., resolution, pixels per inch, size, parallax, contrast, color depth, refresh rate, etc.), in addition to other display characteristics. The preceding examples are intended to be illustrative and non-limiting.

The example wearable platform 100 of FIG. 1B may also include one or more cameras 109. For example, the one or more cameras 109 may be coupled to the second end 113 of the second arm member 119. By way of example, the one or more cameras 109 may be any image sensor capable of capturing an image data, such as a video camera or a depth camera, including stereoscopic camera systems, infrared camera systems, or RGB camera systems.

Figure 2A:
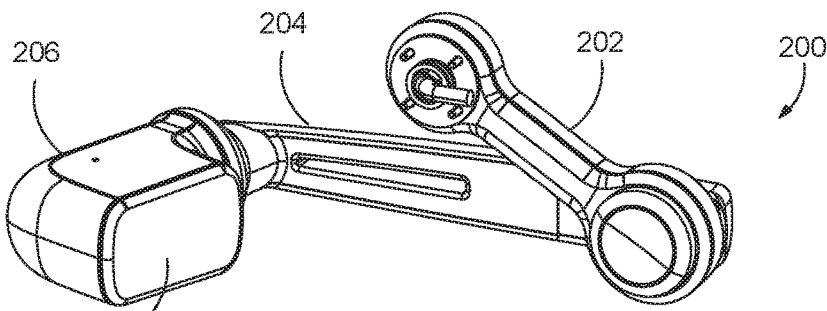
FIGS. 2A-2D illustrate an example display configuration 200, in accordance with embodiments of the present disclosure.
Figure 2B:
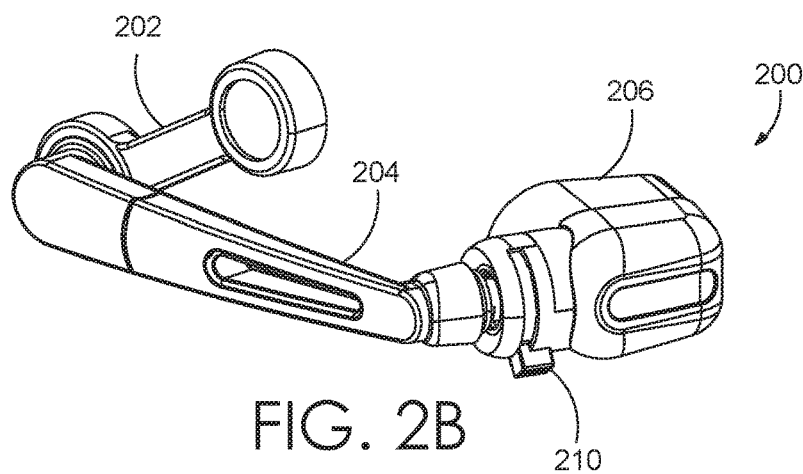

With reference to FIGS. 2A-2D, FIGS. 2A-2D illustrate an example display configuration 200, in accordance with embodiments of the present invention. The display configuration 200 may include one or more rotating members, such as but not limited to first rotating member 202 and second rotating member 204. The display configuration 200 may further include a display module 206. At least one rotating members 202 or 204 may be rotatably coupled to first arm member 114 of FIGS. 1A-1B (i.e. at least one of rotating members 202 or 204 may be coupled to the second end 117 of the first arm member 114 and configured and arranged for rotating relative to frame member 114). In at least one embodiment, second rotating member 204 may be a boom arm that is coupled to a display module 206. The boom may include one or more microphones and may include a display or be configured to operate without an attached display. As illustrated in FIG. 2A, display module 206 may house a display device 208 (e.g., a display screen, heads up display or the like) that is directed towards the eyes of a user when coupled to first arm member 114. The display device may be utilized to provide visual based presentations of UIs, content, information, data, and the like. For example, visual-based presentations include various visual elements, visual indications, and/or visual content that enable the user to receive information, control the wearable device, and access capabilities of the wearable device through interactions with the visual-based presentations of one or more UIs.

Figure 2C:
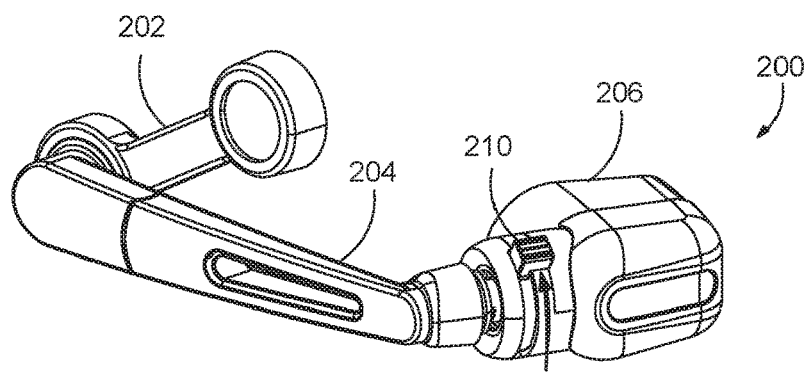
Figure 2D:
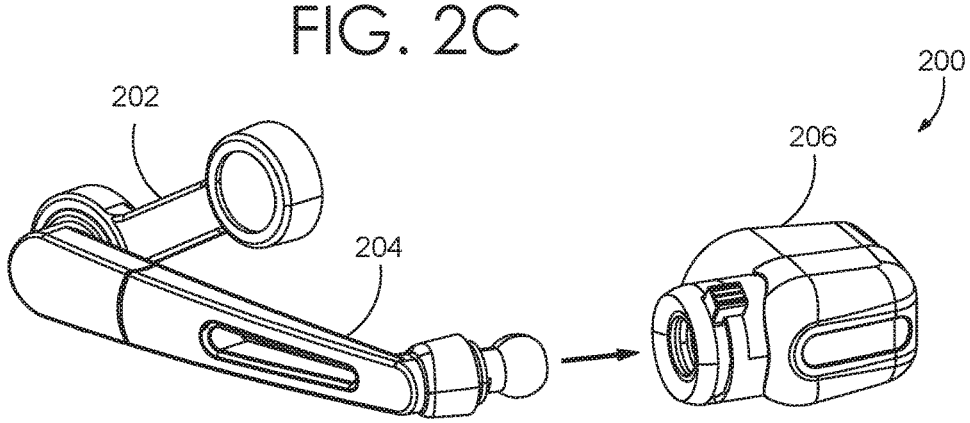

The display module 206 may be removed from the rotating member 204 by a user. As an illustrative example shown in FIG. 2B, the display module 206 may include a locking mechanism 210 that may be used to mechanically couple the display module 206 to second rotating member 204. In operation, as seen in FIG. 2C, locking mechanism 210 may be moved from a "locked" position (See, FIG. 2B) to an "unlocked" position by rotating the locking mechanism upward to release the mechanical connection between the display module 206 and second rotating member 204. Once the locking mechanism 210 has been released, as seen in FIG. 2D, the display module 206 may be separated from the second rotating member 204.

In some embodiments, the removed display module 206 may continue to operate by initiating a wireless connection and providing visual based presentations to a user via the wireless connection. For example, the wearable platform system may determine that the display module 206 is being removed based on detecting that the locking mechanism 210 has been moved from the locked position to the unlocked position. Then, based on this determination, the wearable platform system may initiate a wireless connection with the display module and begin streaming image data from the wearable platform to the display module 206. Further, upon determining that the display module 206 is being removed, the display module 206 may switch from relying on the wearable platform to power the display module 206 to relying on an internal battery to power the display module 206.

Figure 3A:
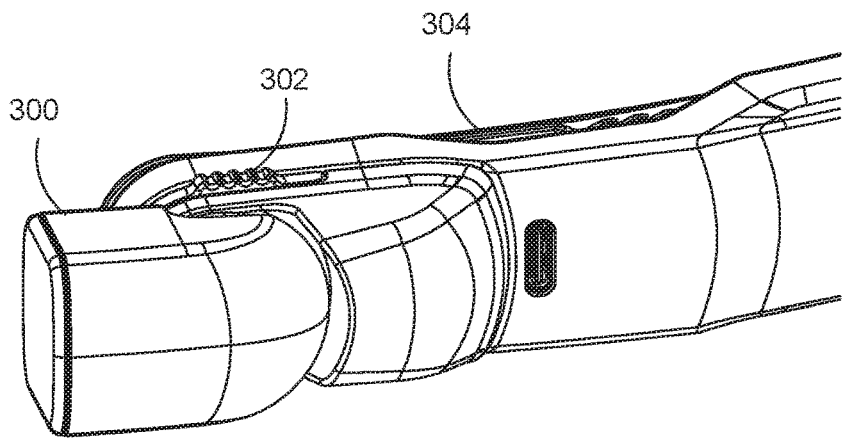
FIGS. 3A-3C illustrate an example camera module, in accordance with embodiments of the present disclosure.
Figure 3B:
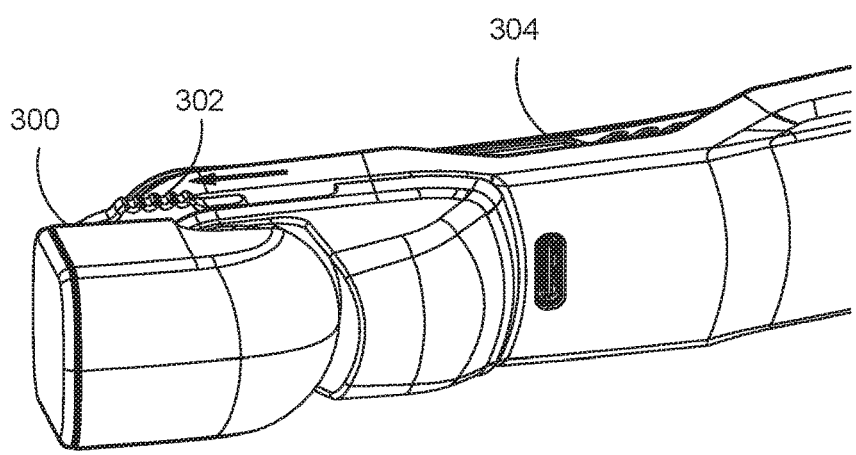
Figure 3C:
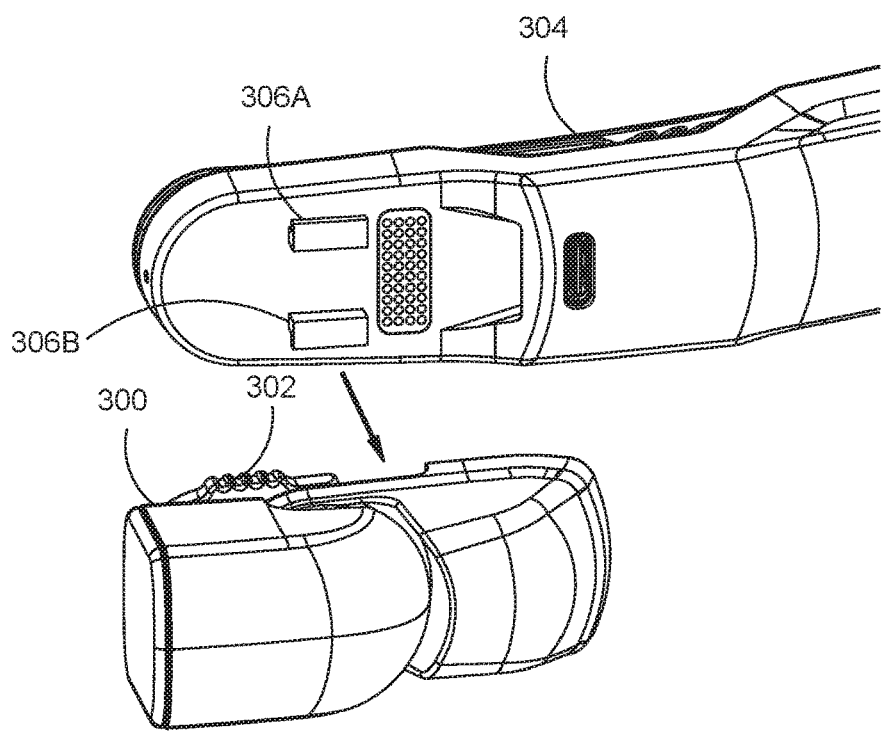

With reference to FIGS. 3A-3C, FIGS. 3A-3C illustrate an example camera module 300, in accordance with embodiments of the present invention. As an illustrative example shown in FIG. 3A-3C, the camera module 300 may include a locking mechanism 302 that may be used to mechanically couple the camera module 300 to an arm member 304 of the wearable platform, which may correspond to second arm member 119 of FIGS. 1A-1B. In operation, as seen in FIG. 3B, locking mechanism 302 may be moved from a "locked" position (See, FIG. 3A) to an "unlocked" position by sliding the locking mechanism to release a mechanical connection between the camera module 300 and arm member 304. For example, the cameral module may be mechanically coupled to arm member 304 by engaging locking mechanism 302, which is attached to camera module 300, with a pair of tabs 306A and 306B. When the locking mechanism 302 is in the locked position, a portion of the locking mechanism 302 may slide below a portion of each of the pair of tabs 306A and 306B. When the locking mechanism 302 is in the unlocked position, the portion of the locking mechanism 302 is separated from the pair of tabs 306A and 306B, such that the camera module 300 may be removed from the arm member 304. As seen in FIG. 3C, once the locking mechanism 302 has been released (i.e., moved to the unlocked position), the camera module 300 may be separated from the second arm member 304.

In some embodiments, the removed camera module 300 may continue to operate by initiating a wireless connection and providing visual based presentations to a user via the wireless connection. For example, the wearable platform system may determine that the camera module 300 is being removed based on detecting that the locking mechanism 302 has been moved from the locked position to the unlocked position. Then, based on this determination, the wearable platform system may initiate a wireless connection with the display module and begin streaming image data from the camera module 300 to the wearable platform. Further, upon determining that the camera module 300 is being removed, the camera module 300 may switch from relying on the wearable platform to power the camera module 300 to relying on an internal battery to power the display module 300.

Figure 4:
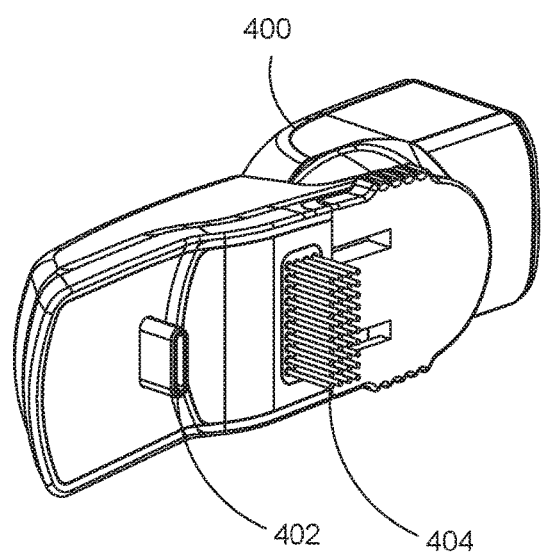

With reference to FIG. 4, FIG. 4 illustrates an example camera module 400, which corresponds to camera module 300 of FIGS. 3A-3C and provides an alternate view of the camera module, in accordance with embodiments of the present invention. Camera module 400 includes an interface port 402 and a set of male pins 404 (e.g., spring loaded pogo pins). The interface port 402 may be a USB port (e.g., USB-C) and may power the camera module 400 and facilitate data communication between the camera module 400 and the wearable platform. Additionally or alternatively, the set of male pins 404 may power the camera module 400 and facilitate data communication between the camera module 400 and the wearable platform. As described above, when the system determines that the set of male pins 404 have decompressed beyond a threshold distance, the system may transition from a hard connection mode to a wireless connection mode by initiating a wireless connection with the camera module 400. In some embodiments, the set of male pins 404 may be longer than those found in conventional systems to allow for the peripheral device to maintain a hard connection for a longer period of time while the wireless connection is being initiated and established with the peripheral device. When the camera module 400 and the wearable platform are operating in a wireless operational mode, the camera module 400 maintains the same or similar functionality as when connected via a hard connection and operating in a hard connection mode. For example, the wearable platform includes a plurality of microphones to enable a user to operate the platform system via voice commands. Regardless of whether the camera module 400 is operating in the hard connection mode or the wireless connection mode, the user may use voice commands to prompt the camera to take a picture or perform other functions.

In further embodiments of the present invention, a peripheral device may transition from a first wireless connection to a second wireless connection based on determining that the peripheral device is being removed. Specifically, a peripheral device that is mechanically coupled to the wearable platform may communicate via a short range wireless connection. When the system determines that the peripheral device is being detached from the wearable platform, the system may transition from the short range wireless connection to a longer range connection. For example, camera module 400 may operate via a short range wireless MIPI connection when the camera module 400 is connected to the wearable device. Upon determining that the camera module 400 is being removed from the wearable platform, the connection mode may transition from the short range wireless MIPI connection to a longer range Wi-Fi connection.

Additionally, in some embodiments, peripheral devices may be coupled to the wearable platform via one or more magnets. Moreover, the system may detect a magnetic field changes between the wearable platform and the peripheral device. Based on these magnetic field changes, the system may determine that a peripheral device is being removed from the wearable platform and initiate a mode transition based on the change.

Figure 5:
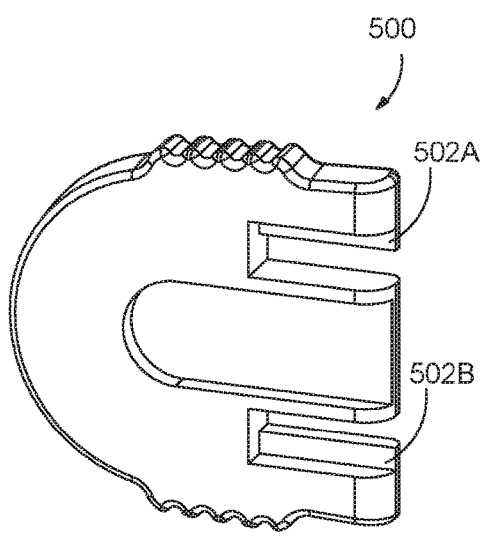

With reference to FIG. 5, FIG. 5 illustrates an example locking mechanism 500, in accordance with embodiments of the present invention. The locking mechanism 500 may correspond to the locking mechanism 302 of FIGS. 3A-3C. As can be seen, locking mechanism 500 may include a pair of tabs 502A and 502B, which may correspond to the pair of tabs 306A and 306B.

Figure 6:
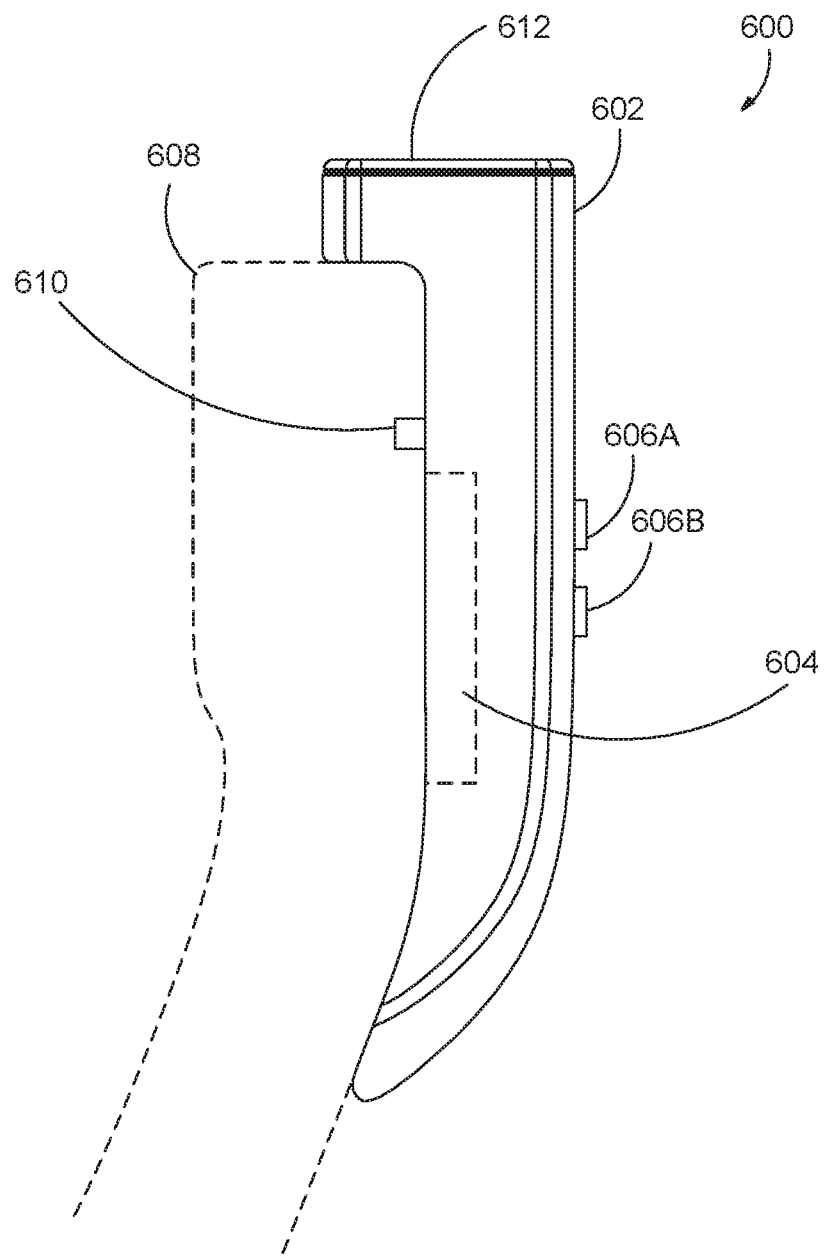

With reference to FIG. 6, FIG. 6 illustrates an example inspection camera module 600, in accordance with embodiments of the present invention. The camera module 600 shows a housing chamber 602, an internal battery 604, buttons 606A and 606B, interface port 610 and a camera component 612. The housing chamber 602 has one or more interior walls defining a chamber, wherein one or more internal batteries 604 may be positioned. While not illustrated in FIG. 6, the housing chamber 602 may further comprise components to enable the inspection camera 600 to establish a wired or wireless connection with the wearable platform. Further, the housing chamber may include one or more magnets to secure the inspection camera 600 to arm member 608. The internal battery 604 may include a battery regulator positioned in the housing chamber 602, wherein the battery regulator may monitor a charge of the internal battery 604 and regulate whether to power the components of the inspection camera 600 using the internal battery 604 or to draw power via the wearable platform. The buttons 606A and 606B may be configured to perform control functions of the inspection camera 600. For example, button 606A may be configured to control recording functions (e.g., start, stop, take still image, etc.) of the inspection camera 600 and button 606B may be configured to control power (e.g., on/off) functions of the inspection camera 600. Interface port 610 may facilitate connection, communication (e.g., via a hard connection), and power supply to the inspection camera 600. For example, interface port 610 may be a USB port (e.g., USB-C) and may simultaneously power the inspection camera 600 and facilitate streaming video from the inspection camera to the wearable platform.

Camera component 612 may include a plurality of sensors and photon-emitters. For example, the camera component 612 may include a variety of camera types and photon-emitter types. The camera types may be any image sensor capable of capturing an image data, such as a video camera or a depth camera, including stereoscopic camera systems, infrared (IR) camera systems, or RGB camera systems and may include attributes such as High-Definition (HD) image, low-light/night vision, IR, RGB, multispectral imaging, hyperspectral imaging, etc. The types of photon-emitters may include, for example, a flashlight, an IR light, or a laser telestration device.

Figure 7A:
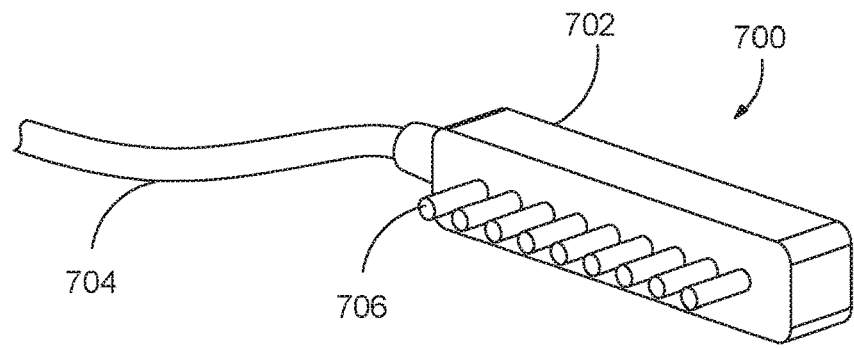
FIGS. 7A-7C illustrates a dual-sided electrical connector assembly 700, in accordance with embodiments of the present disclosure.
Figure 7B:
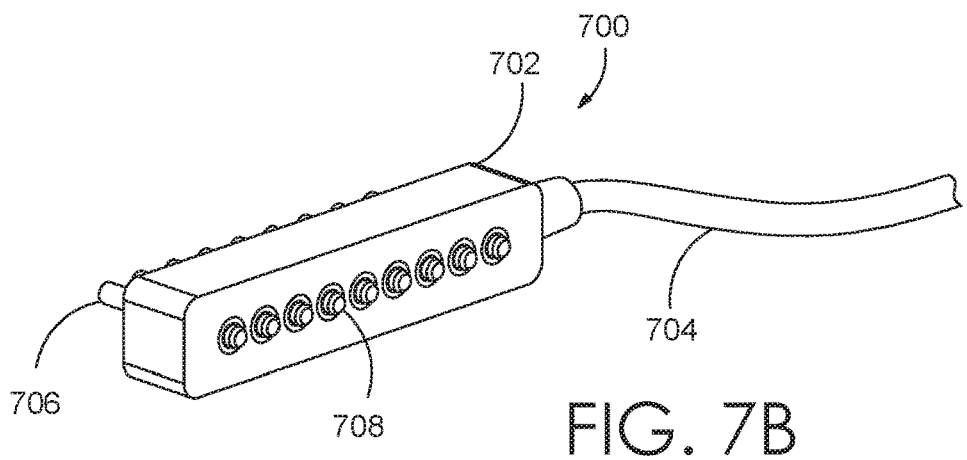
Figure 7C:
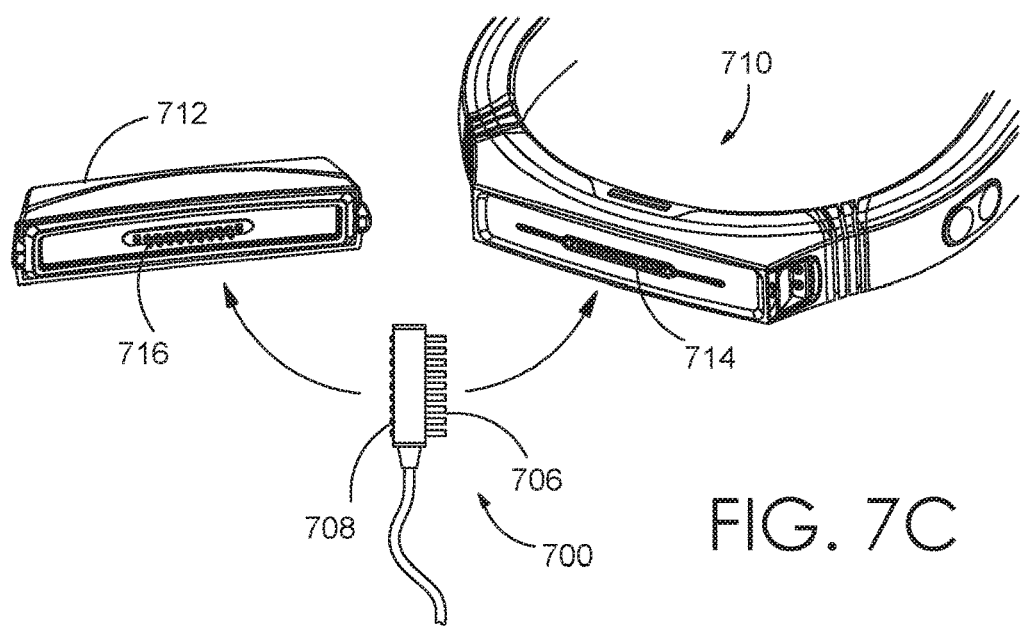

With reference to FIGS. 7A-7C, FIGS. 7A-7C illustrates a dual-sided electrical connector assembly 700, in accordance with embodiments of the present invention. The connector assembly 700 includes housing member 702, power cord 704, a set of male pins 706 (e.g., spring loaded pogo pins), and a set of mating receptacles 708. The connector assembly may be configured to provide energy to one or more rechargeable batteries by delivering an electric current to the one or more rechargeable batteries. The electric current may be delivered via one or both of the set of male pins 706 and the set of mating receptacles 708. For example, the connector assembly 700 may be used to simultaneously charge a device that includes a set of male pins and a device that includes a set of mating receptacles. As an example illustrated in FIG. 7C, a wearable platform 710 may include a set of mating receptacles 714 and an external battery pack 712 may include a set of male pins 716.

The connector assembly 700 may be attached to the set of mating receptacles 714 of the wearable platform 710 by the set of male pins 706 of the connector assembly 700. Further, the connector assembly 700 may, simultaneously, be attached to the set of male pins 706 of the external battery pack 712 by the set of mating receptacles 708 of the connector assembly 700. Advantageously, the wearable device 710 and the external battery pack 712 may be charged simultaneously. The connector assembly may be used to charge any modular component (e.g., camera peripheral, display peripheral, etc.) of the present invention that includes a corresponding interface (e.g., male pins or mating receptacles).

Figure 8:
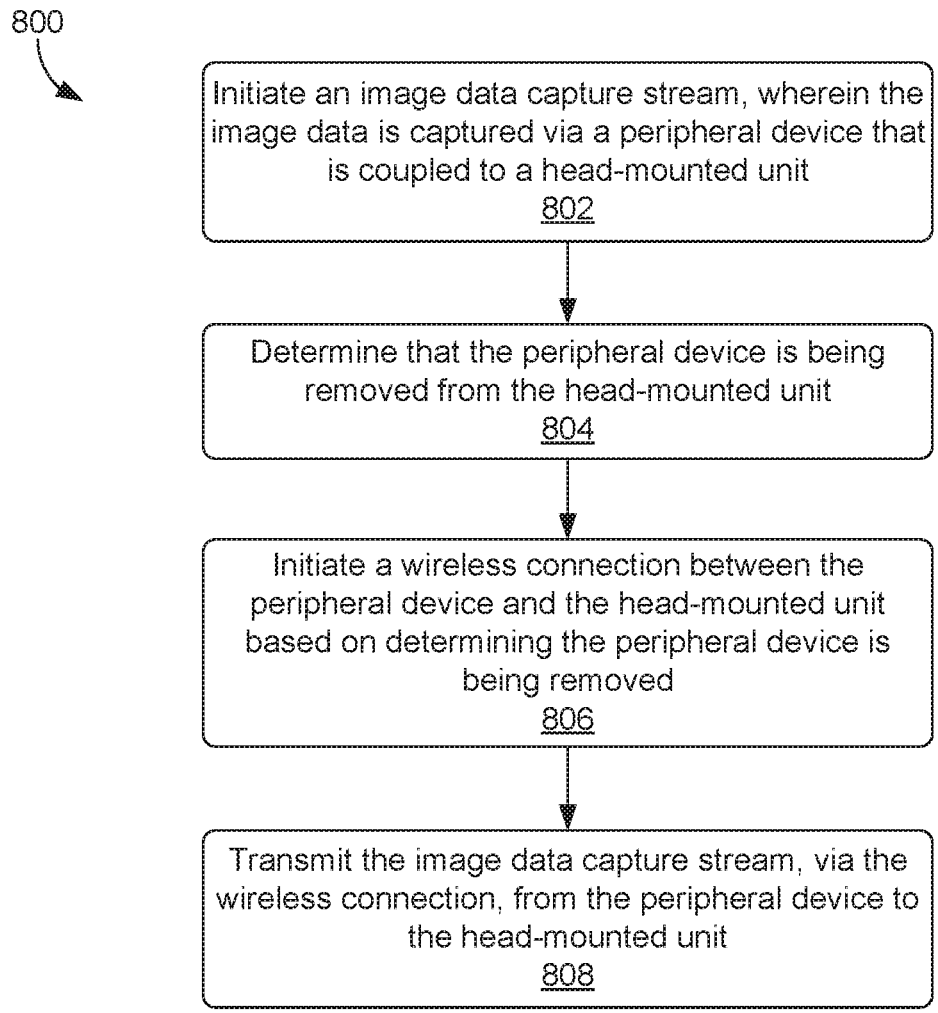
Figure 9:
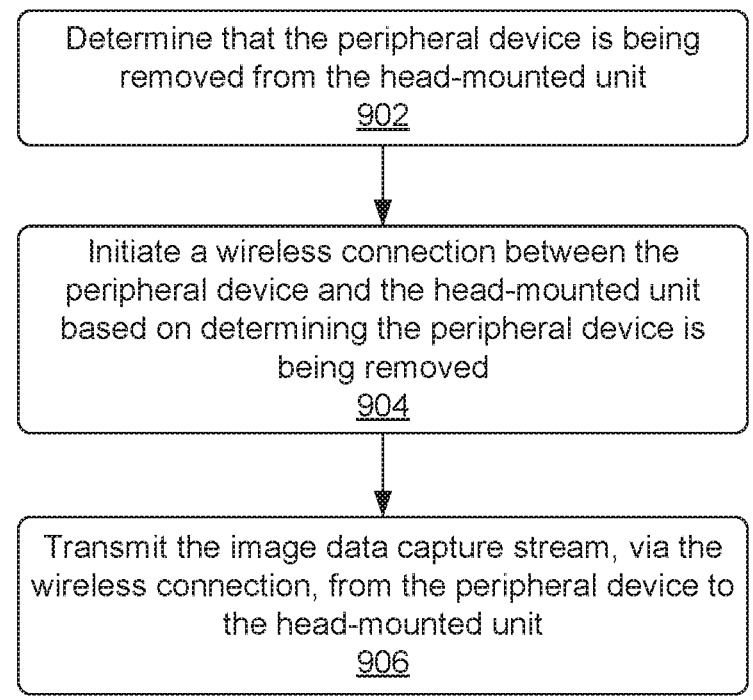

With reference to FIGS. 8 and 9, flow diagrams are provided illustrating methods 800 and 900 for initiating a wireless connection between a peripheral device and a head-mounted unit, in accordance with embodiments of the present invention. Each block of methods 800 and 900, and any other methods described herein, comprise a computing process performed using any combination of hardware, firmware, and/or software. For instance, various functions can be carried out by a processor executing instructions stored in memory. The methods can also be embodied as computer-usable instructions stored on non-transitory computer storage media. The methods can be provided by a standalone application, a service or hosted service (standalone or in combination with another hosted service), or a plug-in to another product, to name a few. The methods 800 and 900 may be implemented by the wearable platform 100 as described in conjunction with FIGS. 1-7.

Turning to FIG. 8, FIG. 8 illustrates method 800 in accordance with embodiments described herein. Initially at block 802, an image data capture stream is initiated, wherein the image data is captured via a peripheral device that is coupled to a head-mounted unit. At block 804, it is determined that the peripheral device is being removed from the head-mounted unit. At block 806, a wireless connection is initiated between the peripheral device and the head-mounted unit based on determining the peripheral device is being removed. At block 808, the image data capture stream is transmitted, via the wireless connection, from the peripheral device to the head-mounted unit.

Turning to FIG. 9, FIG. 9 illustrates method 900 in accordance with embodiments described herein. Initially at block 902, it is determined that the peripheral device is being removed from the head-mounted unit. At block 904, a wireless connection is initiated between the peripheral device and the head-mounted unit based on determining the peripheral device is being removed. At block 906, the image data capture stream is transmitted, via the wireless connection, from the peripheral device to the head-mounted unit.

Having described embodiments of the present invention, an example operating environment in which embodiments of the present invention may be implemented is described below in order to provide a general context for various aspects of the present invention.

Figure 10:
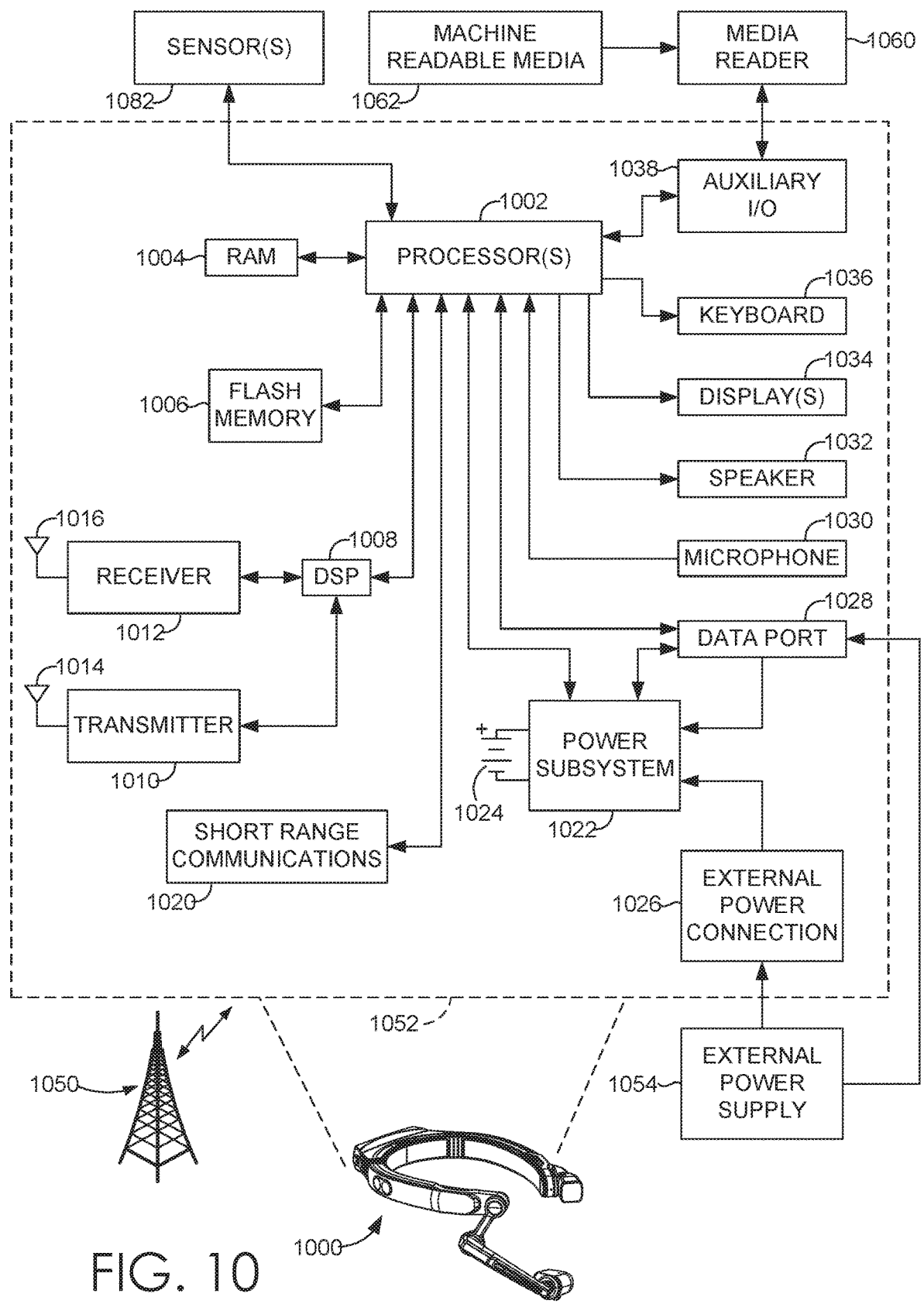

FIG. 10 provides a block diagram of an exemplary wearable device 1000 in which some implementations of the present disclosure may be employed. Any of the various embodiments of wearable devices discussed herein, including but not limited to wearable platform 100 of FIGS. 1A-1B, may include similar features, components, modules, operations, and the like as wearable device 1000. In this example, wearable device 1000 may be enabled for wireless two-way communication device with voice and data communication capabilities. Such wearable devices communicate with a wireless voice or data network 1050 using a suitable wireless communications protocol. Wireless voice communications are performed using either an analog or digital wireless communication channel. Data communications allow the wearable platform 1000 to communicate with other computer systems via the Internet. Examples of wearable platforms that are able to incorporate the above described systems and methods include, for example, a data messaging device, a two-way pager, a cellular telephone with data messaging capabilities, a wireless Internet appliance or a data communication device that may or may not include telephony capabilities.

The illustrated wearable platform 1000 is an example wearable platform configuration that includes two-way wireless communications functions. Such wearable platforms incorporate communication subsystem elements such as a wireless transmitter 1010, a wireless receiver 1012, and associated components such as one or more antenna elements 1014 and 1016. A digital signal processor (DSP) 1008 performs processing to extract data from received wireless signals and to generate signals to be transmitted. The particular design of the communication subsystem is dependent upon the communication network and associated wireless communications protocols with which the device is intended to operate.

The wearable platform 1000 includes a microprocessor 1002 that controls the overall operation of the wearable platform 1000. The microprocessor 1002 interacts with the above described communications subsystem elements and also interacts with other device subsystems such as flash memory 1006, random access memory (RAM) 1004, auxiliary input/output (I/O) device 1038, data port 1028, display 1034, keyboard 1036, speaker 1032, microphone 1030, a short-range communications subsystem 1020, a power subsystem 1022, and any other device subsystems.

A battery 1024 is connected to a power subsystem 1022 to provide power to the circuits of the wearable device 1000. The power subsystem 1022 includes power distribution circuitry for providing power to the wearable device 1000 and also contains battery charging circuitry to manage recharging the battery 1024. The power subsystem 1022 includes a battery monitoring circuit that is operable to provide a status of one or more battery status indicators, such as remaining capacity, temperature, voltage, electrical current consumption, and the like, to various components of the wearable platform 1000, as well as to any peripheral devices connected to the wearable platform 1000.

The data port 1028 is able to support data communications between the wearable platform 1000 and other devices through various modes of data communications, such as high speed data transfers over an optical communications circuits or over electrical data communications circuits such as a USB connection incorporated into the data port 1028 of some examples. Data port 1028 is able to support communications with, for example, an external computer, peripheral device, or other device.

Data communication through data port 1028 enables a user to set preferences through an external device or through a software application and extends the capabilities of the device by enabling information or software exchange through direct connections between the wearable platform 1000 and external data sources rather than via a wireless data communication network. In addition to data communication, the data port 1028 may provide power to the power subsystem 1022 to charge the battery 1024 or to supply power to the electronic circuits, such as microprocessor 1002, of the wearable platform 1000.

Operating system software used by the microprocessor 1002 may be stored in flash memory 1006. Further examples are able to use a battery backed-up RAM or other non-volatile storage data elements to store operating systems, other executable programs, or both. The operating system software, device application software, or parts thereof, are able to be temporarily loaded into volatile data storage such as RAM 1004. Data received via wireless communication signals or through wired communications are also able to be stored to RAM 1004.

The microprocessor 1002, in addition to its operating system functions, is able to execute software applications on the wearable platform 1000. A predetermined set of applications that control basic device operations, including at least data and voice communication applications, is able to be installed on the wearable platform 1000 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the wearable platform 1000 through, for example, the wireless network 1050, an auxiliary I/O device 1038, Data port 1028, short-range communications subsystem 1020, or any combination of these interfaces. Such applications are then able to be installed by a user in the RAM 1004 or a non-volatile store for execution by the microprocessor 1002.

In a data communication mode, a received signal such as a text message or web page download is processed by the communication subsystem, including wireless receiver 1012 and wireless transmitter 1010, and communicated data is provided to the microprocessor 1002, which is able to further process the received data for output to the display 1034, or alternatively, to an auxiliary I/O device 1038 or the data port 1028. A user of the wearable platform 1000 may also compose data items, such as e-mail messages, using the keyboard 1036, which is able to include a complete alpha-numeric keyboard or a telephone-type keypad, in conjunction with the display 1034 and possibly an auxiliary I/O device 1038. Such composed items are then able to be transmitted over a communication network through the communication subsystem.

For voice communications, overall operation of the wearable platform 1000 is substantially similar, except that received signals are generally provided to a speaker 1032 and signals for transmission are generally produced by a microphone 1030. Alternative voice or audio I/O subsystems, such as a voice message recording subsystem, may also be implemented on the wearable platform 1000. Although voice or audio signal output is generally accomplished primarily through the speaker 1032, the display 1034 may also be used to provide an indication of the identity of a calling party, the duration of a voice call, or other voice call related information, for example.

Depending on conditions or statuses of the wearable platform 1000, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1020 provides for data communication between the wearable platform 1000 and different systems or devices, which need not necessarily be similar devices. For example, the short-range communications subsystem 1020 includes an infrared device and associated circuits and components or a Radio Frequency based communication module such as one supporting Bluetooth® communications, to provide for communication with similarly-enabled systems and devices, including the data file transfer communications described above.

A media reader 1060 connectable to an auxiliary I/O device 1038 to allow, for example, loading computer readable program code of a computer program product into the wearable platform 1000 for storage into flash memory 1006. One example of a media reader 1060 is an optical drive such as a CD/DVD drive, which may be used to store data to and read data from a computer readable medium or storage product such as computer readable storage media 1062. Examples of suitable computer readable storage media include optical storage media such as a CD or DVD, magnetic media, or any other suitable data storage device. Media reader 1060 is alternatively able to be connected to the wearable device through the data port 1028 or computer readable program code is alternatively able to be provided to the wearable device 1000 through the wireless network 1050.

Figure 11:
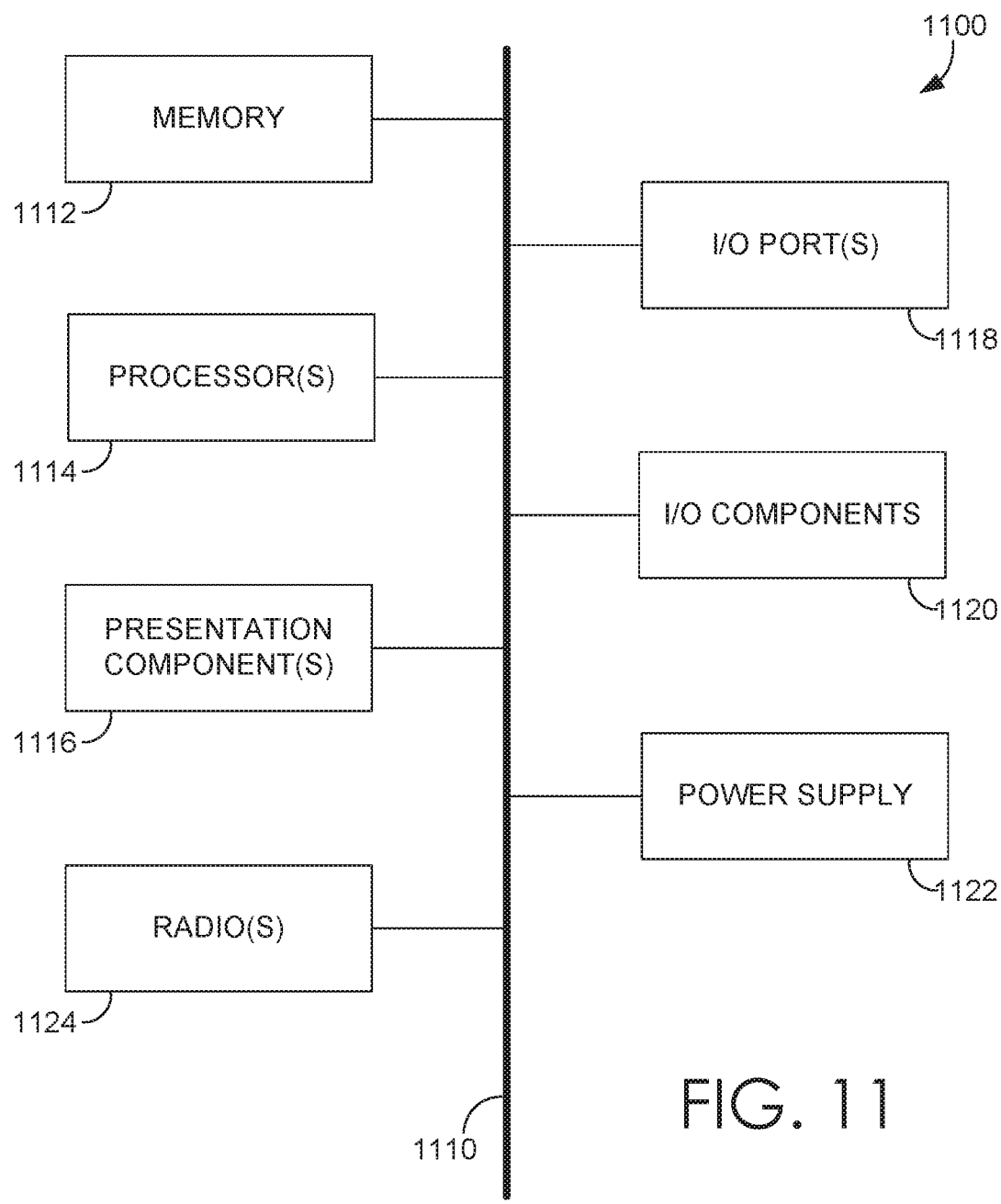

FIG. 11 provides a block diagram of an exemplary computing device 1100 in which some implementations of the present disclosure may be employed. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated. Any computing device discussed herein, such as but not limited to user computing devices 102-108 of FIG. 1, or any of the wearable devices discussed herein, may include similar operations, features, components, modules, and the like, as included in computing device 1100.

The invention may be described in the general context of computer code or machine-useable instructions, including computer-executable instructions such as program modules, being executed by a computer or other machine, such as a personal data assistant or another handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and another wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or another device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

Many variations can be made to the illustrated embodiments of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and sub-combinations are of utility and may be employed without reference to other features and sub-combinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A head-mounted computing device comprising:
   a processor;
   a battery;
   a bridge member configured to be located around a posterior portion of a user's head in a worn position; and
   a first temple member and a second temple member, each having a corresponding first end hingedly coupled to opposing ends of the bridge member, and a corresponding second end,
   the second end of the first temple member presenting:
   a mechanical coupling member adapted to secure a peripheral device thereto via translation of a locking mechanism of the peripheral device along at least one protruding tab of the mechanical coupling member from the second end toward the first end, and
   a hardware interface adapted to couple the peripheral device to the processor when the peripheral device is secured to the second end corresponding to the first temple member via the mechanical coupling member.

2. The device of claim 1, wherein the hardware interface is further adapted to couple the peripheral device to the battery when the peripheral device is secured to the corresponding second end via the mechanical coupling member.

3. The device of claim 1, wherein the hardware interface includes a set of pogo pins adapted to compress when the peripheral device is secured to the corresponding second end via the mechanical coupling member.

4. The device of claim 1, wherein the mechanical coupling comprises a magnetic coupling.

5. The device of claim 1, wherein the peripheral device comprises an internal battery, wherein the peripheral device is configured to operate using the battery of the head mounting computing device when coupled via the mechanical coupling member and to operate using the internal battery when decoupled from the mechanical coupling member.

6. The device of claim 5, wherein the peripheral device is a handheld camera.

7. The device of claim 1, wherein the peripheral device is configured to transmit data to the head mounting computing device via the hardware interface when the peripheral device is secured to the corresponding second end via the mechanical coupling member and to transmit data to the head mounting computing device via a wireless connection when the peripheral device is disconnected from the mechanical coupling member.

8. A non-transitory computer storage medium storing computer-useable instructions that, when used by one or more computing devices, cause the one or more computing devices to perform operations comprising:
   initiating an image data capture stream between a display coupled to a head-mounted unit and a peripheral device, wherein the image data is captured via the peripheral device that is coupled to the head-mounted unit;
   determining that the peripheral device is being removed from the head-mounted unit, wherein determining the peripheral device is being removed is based on determining a set of compressible pogo pins have decompressed beyond a threshold distance;
   based on determining the peripheral device is being removed, initiating a wireless connection between the peripheral device and the head-mounted unit;
   transmitting the image data capture stream, via the wireless connection, from the peripheral device to a processor of the head-mounted unit; and
   providing for display, by the processor, the image data capture stream to the display coupled to the head-mounted unit.

9. The computer storage medium of claim 8, further comprising terminating data transmission via a hard connection based on determining the peripheral device is being removed.

10. The computer storage medium of claim 8, wherein the peripheral device is configured to transmit data to the head mounting unit via a hardware interface when the peripheral device is secured to the head mounting unit and to transmit data to the head mounting unit via a wireless connection when the peripheral device is disconnected from the head mounting unit.

11. The computer storage medium of claim 10, wherein the peripheral device is a camera.

12. The computer storage medium of claim 11, further comprising transmitting image data from the camera to a display peripheral of the head mounted unit via the wireless connection and causing display of the image data at the display peripheral.

13. The computer storage medium of claim 8, further comprising:
   determining that the peripheral device has been reattached to a head-mounted unit;
   based on determining the peripheral device is being reattached, initiating a hard connection between the peripheral device and the head mounted unit and terminating the wireless connection; and
   transmitting the image data capture stream via the hard connection.

14. A computer-implemented method for managing peripheral connections to a head mounted unit, the method comprising:
   initiating an image data capture stream between a peripheral display and a peripheral device via a first wireless connection, wherein the image data is captured via the peripheral device, and wherein the peripheral display and the peripheral device are coupled to a head-mounted unit;
   determining that the peripheral device is being removed from a head-mounted unit, wherein the removal is at least partially based on translation of a locking mechanism of the peripheral device along at least one protruding tab of a coupling member;
   based on determining the peripheral device is being removed, transitioning from the first wireless connection to a second wireless connection; and
   transmitting data, via the second wireless connection, between the peripheral device and the peripheral display coupled to the head-mounted unit.

15. The method of claim 14, wherein determining the peripheral device is being removed is based on determining a set of compressible pogo pins have decompressed beyond a threshold distance.

16. The method of claim 14, wherein the first wireless connection has transmission range that is shorter than the second wireless connection.

17. The method of claim 14, wherein determining the peripheral device is being removed is based on determining a magnetic field change between the peripheral device and the head mounted unit.

18. The method of claim 14, wherein the peripheral device is a camera.

19. The method of claim 14, further comprising:
   determining that the peripheral device has been reattached to a head-mounted unit; based on determining the peripheral device is being reattached, transitioning to the first wireless connection between the peripheral device and the head mounted unit and terminating the second wireless connection; and
   transmitting the image data capture stream via the first wireless connection.

* * * * *